(12) United States Patent
Claussen et al.

(10) Patent No.: US 11,623,665 B1
(45) Date of Patent: Apr. 11, 2023

(54) TRI-MODE LOCOMOTIVE

(71) Applicant: Knoxville Locomotive Works, Inc., Knoxville, TN (US)

(72) Inventors: Pete Claussen, Knoxville, TN (US); Scott Gatewood, Knoxville, TN (US)

(73) Assignee: Knoxville Locomotive Works, Inc., Knoxville, TN (US)

( * ) Notice: Subject to any disclaimer, the term of this patent is extended or adjusted under 35 U.S.C. 154(b) by 326 days.

(21) Appl. No.: 16/939,575

(22) Filed: Jul. 27, 2020

(51) Int. Cl.
*B61C 7/04* (2006.01)
*B61G 5/06* (2006.01)
*B61C 17/00* (2006.01)

(52) U.S. Cl.
CPC .............. *B61C 7/04* (2013.01); *B61C 17/00* (2013.01); *B61G 5/06* (2013.01)

(58) Field of Classification Search
CPC .............. B61C 7/04; B61C 17/00; B61G 5/06
See application file for complete search history.

(56) References Cited

U.S. PATENT DOCUMENTS

| | | | |
|---|---|---|---|
| 7,231,877 B2 | 6/2007 | Kumar | |
| 7,304,445 B2 | 12/2007 | Donnelly | |
| 7,518,254 B2 | 4/2009 | Donnelly et al. | |
| 8,371,230 B2 | 2/2013 | Kumar | |
| 8,565,946 B2 * | 10/2013 | Cooper | B61L 15/0036 701/19 |
| 8,925,465 B2 | 1/2015 | Foege | |
| 9,079,589 B2 * | 7/2015 | Cooper | B61L 15/0036 |
| 9,193,362 B2 * | 11/2015 | Foege | B61C 17/02 |
| 2010/0186619 A1 | 7/2010 | Kumar | |
| 2014/0318410 A1 | 10/2014 | Kral et al. | |
| 2017/0073026 A1 | 3/2017 | Mugele | |

FOREIGN PATENT DOCUMENTS

| | | |
|---|---|---|
| WO | 2005084335 A2 | 9/2005 |
| WO | 2007143850 A1 | 12/2007 |

\* cited by examiner

*Primary Examiner* — Robert J McCarry, Jr.
(74) *Attorney, Agent, or Firm* — Luedeka Neely Group, PC

(57) ABSTRACT

A locomotive consist including a pair of fuel-electric locomotives, each having a prime mover engine and a power transmission system including a main generator and traction motors coupled to driving wheels, a high voltage electrical connection operable in an on state or an off state, and a computer controller. The pair of fuel-electric locomotives is configured to selectively cooperate to operate in three different operating modes as controlled by the computer controller: (1) a prime mover mode, (2) a mother/slug mode, and a mother/inoperative mode.

4 Claims, 2 Drawing Sheets

TRI-MODE LOCOMOTIVE

FIELD

This disclosure relates to the field of fuel-electric locomotives. More particularly, the disclosure relates to fuel-electric locomotives of improved construction and configured to have multiple operational modes for use in a consist for enhanced fuel efficiency, reduced operating costs, reduced maintenance, and reduced emissions.

BACKGROUND

Improvement is desired in construction and operation of fuel-electric locomotives. What is desired is a locomotive system configured to reduce operation time of the collective associated fuel engines to improve fuel economy, reduce emissions, and lower maintenance and other operational costs.

Each fuel-electric locomotive in a conventional locomotive consist always has its prime mover engine operating. Each trailing locomotive of the consist is operated in the same manner as the lead locomotive by a multiple-unit train controller (MU controller) and connection and an associated air-line for the brakes. An engineer operates the lead locomotive and a control signal is sent to each trailing locomotive so that each trailing locomotive operates the same as the lead locomotive. Thus, the prime mover engine setting for each trailing locomotive is always the same as the prime mover engine setting for the lead locomotive. For a majority of the operation of the consist the extra horsepower represented by the operation of the prime mover engines of the trialing locomotives is not utilized and represents waste.

A conventional railroad slug is an accessory to a fuel-electric locomotive. It has traction motors but, unlike a conventional locomotive, it cannot generate power on its own since it lacks a prime mover engine. Instead, the slug is connected to a powered locomotive, called the mother. The MU controller of the mother locomotive provides the needed electrical power to operate the traction motors via a high voltage connection, and the traction motor controls via a separate slug control connection. The air-line of the mother locomotive provides air for braking.

Accordingly, in a conventional consist having two locomotives, each locomotive is operated identically and both fuel engines are always operating. This is the case even if a slug is added. This represents considerable waste of fuel, engine operating time and its associated maintenance, and increased emissions, all of which are undesireable.

The present disclosure advantageously provides improved fuel-electric locomotives that have additional modes of operation and cooperate to reduce the net operating time of the collective fuel engines of the consist. That is, in a consist having a pair of the locomotives of the disclosure, the prime mover engines can be independently operated so that the prime mover engine of the trailing locomotive can be turned off and not have to run all the time that the prime mover engine of the lead locomotive is on. This improves fuel economy, reduces emissions and maintenance, and lowers operational costs as compared to use of conventional locomotives. Better fuel economy is achieved by running a single engine at a higher RPM when the turbos and engine efficiencies are at its highest.

For example, in accordance with the disclosure, a two locomotive consist can be provided and operated so that it is not requisite to have the engine of the trailing locomotive operating at all times. This represents considerable fuel savings, reductions in maintenance, and reductions in emissions.

Further, if a slug is added to a conventional two locomotive consist, the slug represents an additional equipment cost. The present disclosure provides a two locomotive consist that is able to operate in a mother/slug configuration with only the two locomotives. This represents considerable reductions in costs and maintenance.

SUMMARY

The above and other needs are met by improved locomotive consists and locomotives.

In one aspect, a locomotive consist according to the disclosure includes a pair of fuel-electric locomotives. Each fuel-electric locomotive has a prime mover engine and a power transmission system including a main generator and traction motors coupled to driving wheels, a high voltage electrical connection operable in an on state or an off state, and a computer controller. The pair of fuel-electric locomotives is configured to selectively cooperate to operate in three different operating modes as controlled by the computer controller.

One of the operating modes is a prime mover mode in which the prime mover engine of each of the fuel-electric locomotives is on and used to operate its own main generator to make power for its own traction motors, and the high voltage electrical connection is in the off state.

Another operating mode is a mother/slug mode in which the prime mover engine of one of the locomotives is off, the high voltage electrical connection is in the on state, and the prime mover engine of the other locomotive is on and used to operate its own generator to supply power for its traction motors, and to also supply power to the traction motors of the other locomotive whose prime mover engine is off.

A further operating mode is a mother/inoperative mode in which the prime mover engine of one of the locomotives is off, the high voltage electrical connection is in the off state, and the prime mover engine of the other locomotive is on and used to operate its own generator to supply power for its traction motors and does not supply power to the traction motors of the other locomotive.

In another aspect, a fuel-electric locomotive according to the disclosure includes a prime mover engine and a power transmission system including a main generator and traction motors coupled to driving wheels, a high voltage electrical connection, and a computer controller, The locomotive is selectively operable as: (a) a prime mover locomotive in which the prime mover engine of the locomotive is operating and used to operate the generator to make power for operation of the fuel-electric locomotive; (b) a mother locomotive in which the prime mover engine is operating and used to operate the generator to make power for operation of the fuel-electric locomotive and also provides power to another locomotive; (c) a slug in which the prime mover engine is not operating and the locomotive receives power from another locomotive to power the traction motors; and (d) an inoperative locomotive in which the prime mover engine is not operating and the locomotive does not receive power from another locomotive to power the traction motors.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1A:
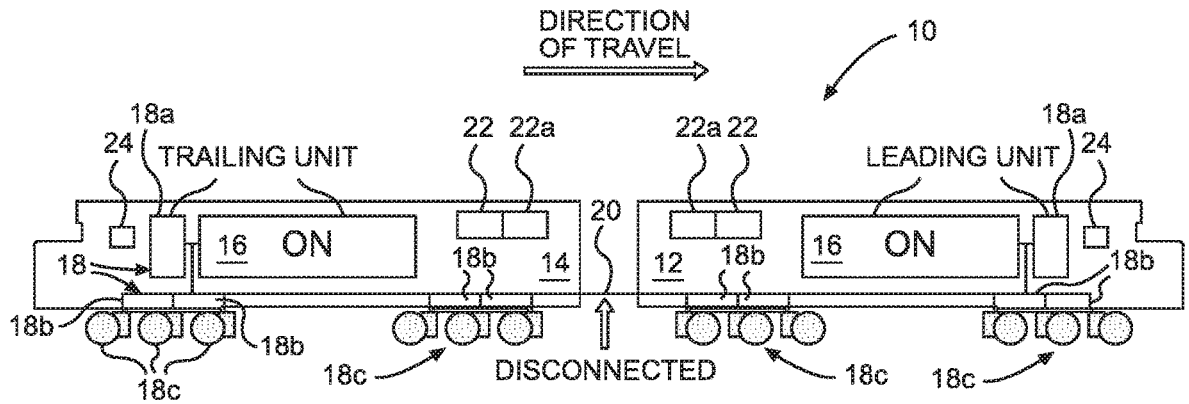
FIGS. 1A and 1B depict a prime mover operational mode for a pair of tri-mode locomotives according to the disclosure.
Figure 1B:
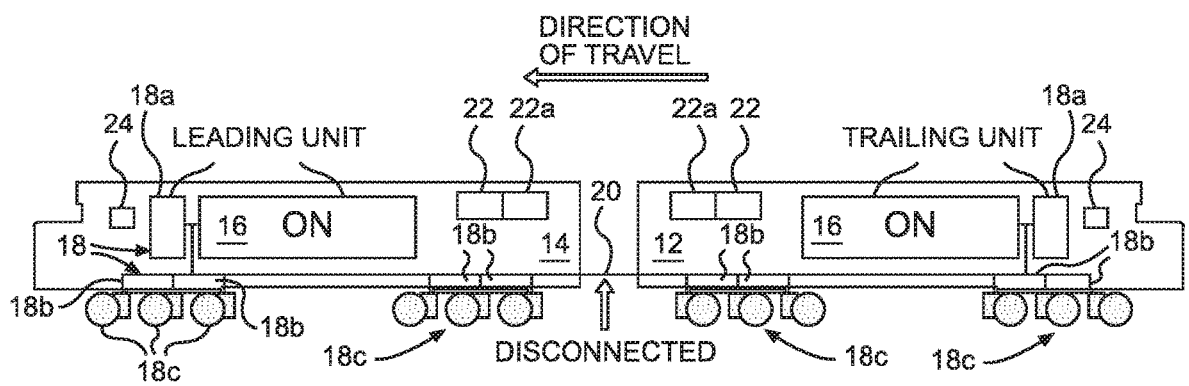

With initial reference to FIGS. 1A and 1B, there is shown a train or locomotive consist 10 having two identically and specially configured fuel-electric locomotives 12 and 14.

The locomotives 12 and 14 are configured to be able to operate in three different modes: (1) a prime mover mode; (2) a mother/slug mode; and (3) a mother/inoperative mode. Thus, each of the locomotives 12 and 14 can operate as a prime mover locomotive, a mother locomotive, a slug, and an inoperative locomotive.

FIGS. 1A and 1B depicts the prime mover mode. When the consist 10 is operating in the prime mover mode the diesel or other fuel engines of both of the locomotives 12 and 14 are on.

In the mother/slug mode only the diesel engine of one of the locomotives 12/14 is on and this locomotive serves as a mother. The other locomotive serves as a slug and the mother provides power for the drive wheels of both locomotives.

In the mother/inoperative mode, only the diesel engine of one of the locomotives 12/14 is on and this locomotive serves as the mother. The other locomotive serves as an inoperative locomotive. In this mode the mother powers only its own the drive wheels.

As will be noted, the fuel-engines of the locomotives 12 and 14 both are on only in the prime mover mode. In the mother/slug mode and in the mother/inoperative mode only the fuel-engine of the mother locomotive is on. The consist 10 having the locomotives 12 and 14 may thus be operated in a manner that diverges significantly from the operation of a conventional consist and achieve substantial savings in fuel, maintenance, and other costs.

In this regard, the consist 10 of the disclosure enables substantial savings in fuel and maintenance as compared to a conventional consist having conventional locomotives and conventional slugs. For example, in a conventional consist in which the locomotives all have their engines operating there is considerable time during the operation when the consist does not require all of the power output by the engines of the locomotives. This represents considerable waste in fuel and hours of engine operation which result in engine wear and engine maintenance.

The consist 10 may be a freight train or passenger train and include additional non-powered cars that the locomotives 12 and 14 pull or push to provide the consist 10. The consist 10 as described herein includes the locomotives 12 and 14 as a pair of locomotives in the consist 10. It is contemplated that the consist 10 may include additional locomotives including additional pairs of the locomotives 12 and 14.

Each of the locomotives 12 and 14 has a prime mover engine 16 and a power transmission system 18 including a main generator 18a, traction motors 18b geared to driving wheels 18c.

The locomotives 12 and 14 further include a high voltage electrical connection 20, an MU controller 22, and an auxiliary controller 22a. The locomotives 12 and 14 each also include a cab 24 within which an engineer is located when the locomotive 12 and/or 14 is the lead locomotive of the locomotive consist 10.

Figure 1C:
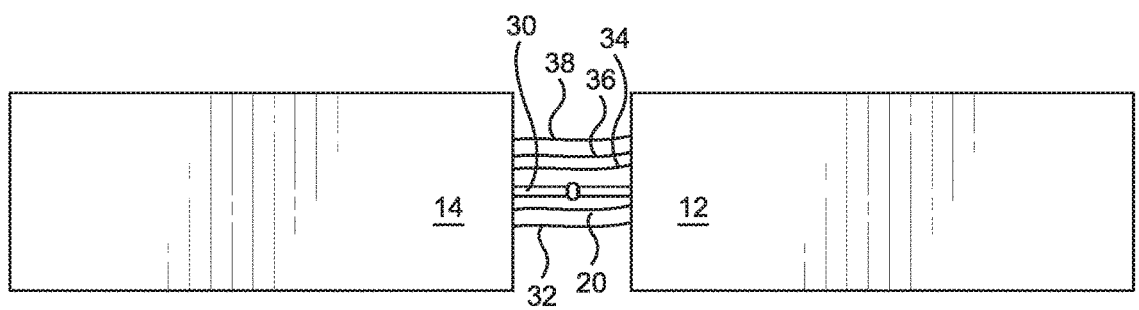
FIG. 1C shows connections between the locomotives.

With reference to FIG. 1C, the locomotives 12 and 14 are physically connected to one another via cooperating conventional railway couplings 30. In addition to the high voltage connection 20, the locomotives 12 and 14 also have an air-line 32 and electrical connections in the form of a MU connection 34, an electrical connection for traction motor cooling air motors 36, and a slug control connection 38.

Conventional locomotives have the railway couplings 30, the air-line 32, and the MU connection 34. A conventional locomotive connected to a conventional slug will also have the high voltage connection 20 and the slug control connection 38.

Conventional locomotives lack the auxiliary controller 22a and the multiple operational features of the locomotives 12 and 14 of the disclosure. Conventional locomotives also lack the electrical connection for traction motor cooling air motors 36, as described more fully below.

The prime mover engine 16 is a conventional locomotive fuel engine, either a diesel or gasoline engine suitable to power the locomotive 12 or 14 as a primary locomotive. The prime mover engine 16 rotates the main generator 18a which produces electricity to power the traction motors 18b that are geared to the driving wheels 18c.

The power transmission system 18 electrically connects the prime mover engine 16 to the driving wheels 18c, as there is no mechanical connection between the prime mover engine 16 and the driving wheels 18c.

The main generator 18a of the power transmission system 18 may be provided by a conventional locomotive DC generator or a conventional locomotive electrical AC alternator-rectifier. In either case, whether the main generator 18a is outputting direct current or alternating current, the output provides power to the traction motors 18b.

The traction motors 18b and driving wheels 18c are conventional AC or DC electric motors and driving wheels used for propulsion of a fuel-electric locomotive. The motors 18b include conventional cooling devices such as cooling fans for cooling the motors during operation.

With reference to FIGS. 1A and 1B, when the consist 10 is operating in prime mover mode, both the locomotives 12 and 14 will be in prime mover mode. This is characterized by the engines 16 of both the locomotive 12 and the locomotive 14 being operated and each of the engines 16 is exclusively used to operate its own generator 18a to make power for its own traction motors 18b, and the high voltage electrical connection 20 is in an Off state and power is not supplied from the lead locomotive to power the traction motors 18b of the trailing locomotive and their associated cooling fans.

Figure 2A:
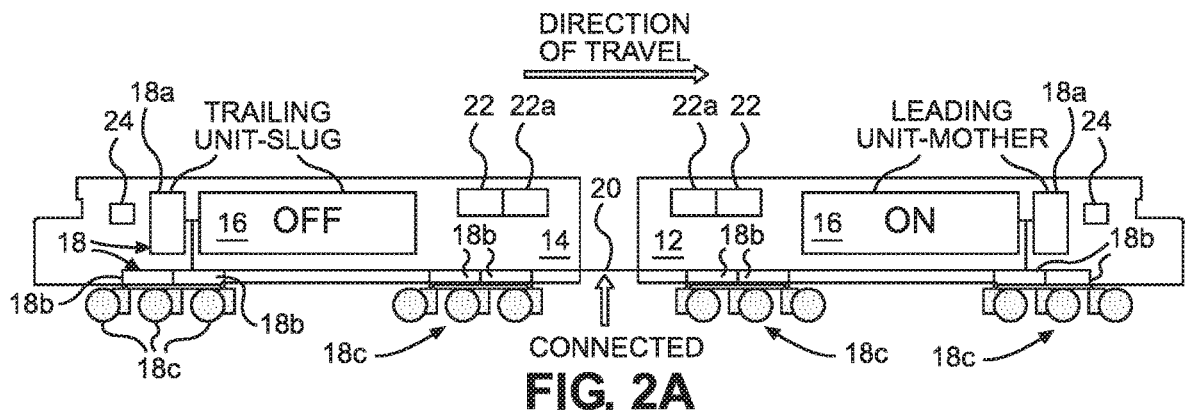
FIGS. 2A and 2B depicts a mother/slug operational mode for the pair of tri-mode locomotives.
Figure 2B:
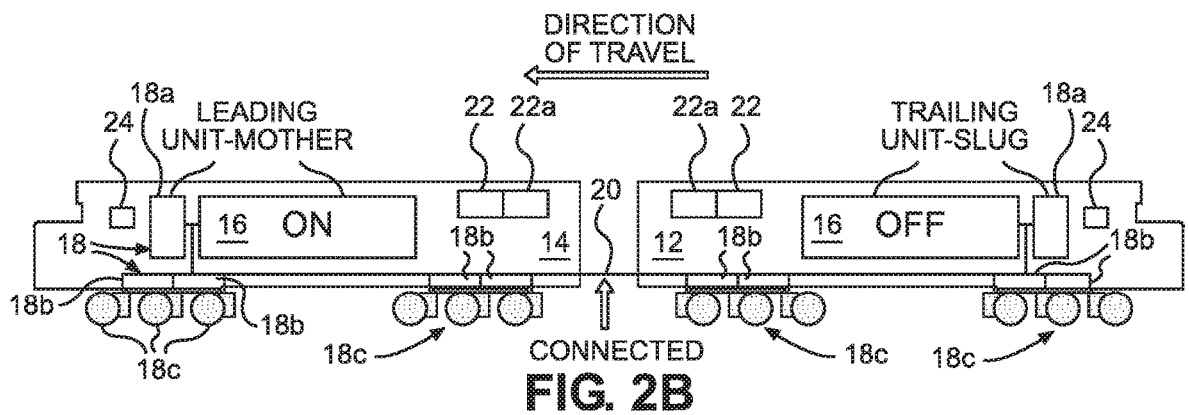

FIGS. 2A and 2B depict the consist 10 operating in mother/slug mode, with the lead locomotive serving as a mother and the trailing locomotive serving as a slug. As shown, the high voltage connections 20 are in a connected state so that the generator 18a of the lead locomotive is also able to supply electrical power to the traction motors 18b of the trailing locomotive. Only the fuel-engine 16 of the mother locomotive is on.

With further reference to FIGS. 2A and 2B, during operation of the consist 10 in the mother/slug mode, it will be appreciated that at low speeds the lead or mother locomotive can develop substantially more power than it needs for the operation of its own traction motors 18b. Thus, the surplus power may be sent to the trailing or slug locomotive, which does not have its engine 16 turned on, to provide electrical power for the traction motors 18b of the trailing locomotive that is in the slug mode via the high voltage connections 20.

Figure 3A:
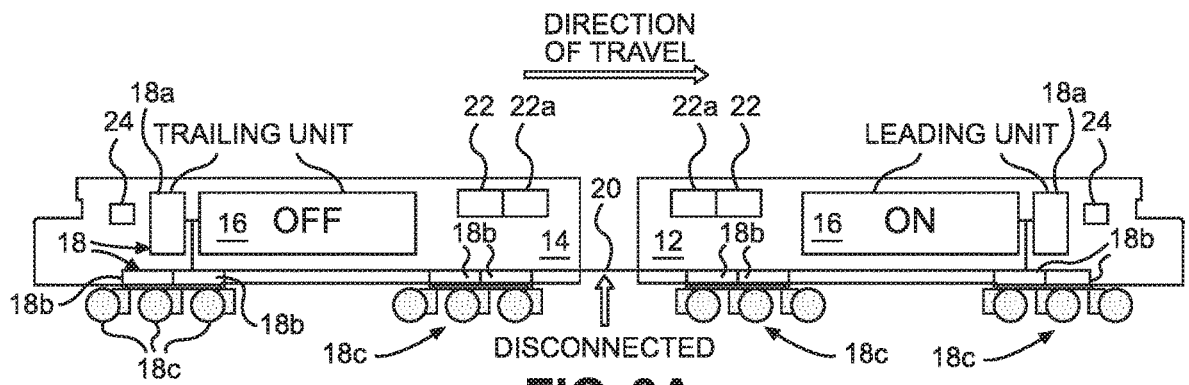
FIGS. 3A and 3B depict a mother/inoperative operational mode for the pair of tri-mode locomotives.
Figure 3B:
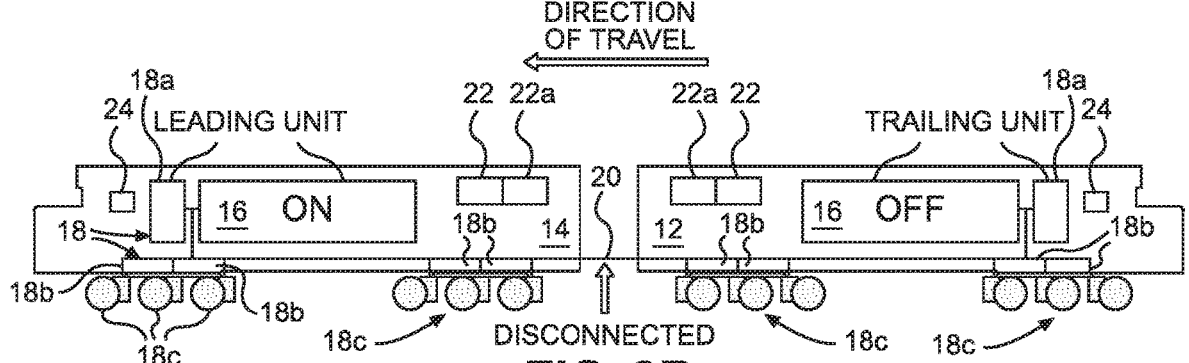

With reference to FIGS. 3A and 3B, the mother/inoperative mode is the same as the mother/slug mode, except the high voltage electrical connection 20 is in an off state or disconnected state and power is not supplied from the lead locomotive to power the traction motors 18b of the trailing locomotive.

The consist 10 can transition between the various modes as needed. For example, if the consist 10 is operating in prime mover mode or mother/slug mode, if the consist 10 slows its speed or reaches a point that the extra power from operation of the traction motors 18b of the trailing locomotive is not needed, the consist 10 will transition to the mother/inoperative mode. As noted above, in the mother/inoperative mode the fuel engine 16 of the inoperative locomotive is off and the high voltage connections 20 are disconnected.

However, in the mother/inoperative mode, the traction motors 18b of the trailing/inoperative locomotive are not powered but are operative to provide dynamic braking. Dynamic braking is the use of an electric traction motor as a generator when slowing the consist 10. However, dynamic braking generates heat and the traction motors 18b can overheat if their associated cooling devices such as cooling fans are not operated. Thus, the electrical connection for traction motor cooling air motors 36 is utilized in the mother/inoperative mode to provide electrical power to operate cooling fans associated with the otherwise unpowered traction motors 18b of the trailing locomotive. The electrical connection for traction motor cooling air motors 36 is desirably a three phase AC connection between the locomotives 12 and 14.

As noted, the consist 10 is advantageously configured to enable fluid transition between the various modes based on power needs of the consist 10. For example, when the consist 10 is operating in the mother/inoperative mode, if the auxiliary controller 22a senses that extra power is needed for the consist 10, the consist 10 will transition back to the mother/slug mode or the prime mover mode as needed, and return to the mother/inoperative mode when the need for extra power is not needed. These transitions between the modes are controlled by the auxiliary controllers 22a to happen repeatably as needed during travel of the consist 10 to minimize operation of the traction motors 18b of the trailing locomotive.

In this regard, the auxiliary controller 22a of the lead locomotive operates the locomotives 12 and 14 in a manner to more efficiently operate the consist 10 and to minimize the operation of the engines 16, which represents associated fuel usage and emissions. The auxiliary controllers 22a include software operative to automatically change between the modes (prime mover/prime mover, mother/slug, mother/inoperative) as required for efficient operation of the locomotives 12 and 14.

As further example, as the consist 10 picks up speed during operation in the mother/slug mode, the amount of surplus power available from the engine 16 of the lead locomotive declines. When the speed of the consist 10 is at about 10 to 12 miles per hour it is typical that the lead locomotive needs all of the power it generates from operation of its engine 16 for its own traction motors 18b to increase the speed of the consist 10. Thus, at this point it is desirable to disconnect the high voltage connection 20 and operate the consist 10 in the mother/inoperative mode as shown in FIGS. 3A and 3B.

As will be further noted, in both the mother/slug mode and the mother/inoperative mode, the engine 16 of the trailing locomotive is off, thereby saving fuel, maintenance, and reducing emissions.

During operation of the consist 10 in the mother/slug mode or the mother/inoperative mode, if it is sensed by the controller 22a of the lead locomotive that the power produced by engine 16 of the lead locomotive is insufficient to continue to accelerate the consist 10, the auxiliary controller 22a will send a signal to start the engine 16 of the trailing locomotive and return the consist 10 to the prime mover mode of FIGS. 1A and 1B.

Thus, as shown by the foregoing examples, the consist 10 may be operated in a manner to reduce the amount of time that the consist 10 has both of the locomotives 12 and 14 in prime mover mode. Thus, for the circumstance where the consist 10 has changed from the mother/slug mode to the prime mover mode, if the auxiliary controller 22a detects that the power of the trailing locomotive is not needed, as for example when the consist 10 goes downhill, the engine 16 of the trailing locomotive is automatically turned off again and the locomotive reverts back to the mother/inoperative mode with the high voltage connection 20 remaining disconnected.

This state of operation remains unless and until the auxiliary controller 22a of the lead locomotive determines that additional power is needed. In such case, the electrical connection 20 is placed in a connected state and electrical power is supplied from the trailing locomotive to the traction motors 18b of the trailing locomotive to return the consist 10 to the mother/slug mode. Likewise, if the power from both of the engines 16 is needed, the consist 10 returns to the prime move mode.

While not required, it is desirable to operate the locomotives 12 and 14 with predictive software so that the consist 10 can be operated in mother/slug mode and mother/inoperative mode at optimum times during the trip. For example, the predictive software would determine, and automatically operate, the software associated with the auxiliary controllers 22a to turn the power off to the trailing locomotive at the optimum time before the consist 10 reaches the top of a hill or to turn it on at the optimum time as it approaches a hill.

Either or both of the locomotives 12 and 14 may also be used alone as a conventional locomotive, and can be used to power a conventional slug. The locomotives 12 and 14 may also operate in a multiple locomotive consist with conventional locomotives or become part of a distributed power arrangement either as a single locomotive or together as described with the tri-mode features.

Accordingly, the present device advantageously provides an improved locomotive system configured to reduce operation time of the associated fuel engines and traction motors to improve fuel economy, reduce emissions, and lower operational costs. The locomotives are advantageously configured to have multiple operational modes (prime mover mode, mother mode, slug mode, and inoperative mode) for use in a consist for enhanced fuel efficiency and reduced emissions.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A locomotive consist, comprising:
a pair of fuel-electric locomotives, each fuel-electric locomotive having a prime mover engine and a power transmission system including a main generator and traction motors coupled to driving wheels, a high voltage electrical connection operable in an on state or an off state, and a computer controller, with the pair of fuel-electric locomotives configured to selectively cooperate to operate in three different operating modes as controlled by the computer controller, the operating modes comprising:
(a) a prime mover mode in which the prime mover engine of each of the fuel-electric locomotives is on and used to operate its own main generator to make power for its own traction motors, and the high voltage electrical connection is in the off state;
(b) a mother/slug mode in which the prime mover engine of one of the locomotives is off, the high voltage electrical connection is in the on state, and the prime mover engine of the other locomotive is on and used to operate its own generator to supply power for its traction motors, and to also supply power to the traction motors of the other locomotive whose prime mover engine is off; and
(c) a mother/inoperative mode in which the prime mover engine of one of the locomotives is off, the high voltage electrical connection is in the off state, and the prime mover engine of the other locomotive is on and used to operate its own generator to supply power for its traction motors and does not supply power to the traction motors of the other locomotive, and an electrical connection operative in the mother/inoperative mode to supply electrical power during dynamic braking to cooling fans associated with the traction motors of the locomotive whose prime mover engine is off.

2. The locomotive consist of claim 1, wherein each of the fuel-engine locomotives includes a railway coupling, an air-line, an MU connection, a slug control connection, and an electrical connection for traction motor cooling air motors.

3. The locomotive consist of claim 1, wherein when the consist is in the mother/slug mode or the mother/inoperative mode and moving solely under power supplied by the prime mover engine of one of the locomotives, the computer controller is operative to determine when the power supplied by the prime mover engine that is on is insufficient to continue to continue to accelerate the consist, and the computer controller operates to turn on the other prime mover engine and transition the consist to the prime mover mode.

4. A fuel-electric locomotive, comprising: a prime mover engine and a power transmission system including a main generator and traction motors coupled to driving wheels, cooling fans associated with the traction motors, traction motor cooling air motors, an electrical connection for the traction motor cooling air motors, a high voltage electrical connection, and a computer controller, wherein the locomotive is selectively operable as:
(a) a prime mover locomotive in which the prime mover engine of the locomotive is operating and used to operate the generator to make power for operation of the fuel-electric locomotive;
(b) a mother locomotive in which the prime mover engine is operating and used to operate the generator to make power for operation of the fuel-electric locomotive and also provides power to another locomotive;
(c) a slug in which the prime mover engine is not operating and the locomotive receives power from another locomotive to power the traction motors; and
(d) an inoperative locomotive in which the prime mover engine is not operating and the locomotive does not receive power from another locomotive to power the traction motors, and when the locomotive is operating as an inoperative locomotive the electrical connection for the traction motor cooling air motors provides electrical power during dynamic braking to the cooling fans associated with the traction motors thereof.

\* \* \* \* \*